Sept. 24, 1968 O. KILE 3,402,839
APPARATUS FOR HANDLING PACKS OF PRINTED SIGNATURES
Original Filed March 22, 1962 14 Sheets-Sheet 4

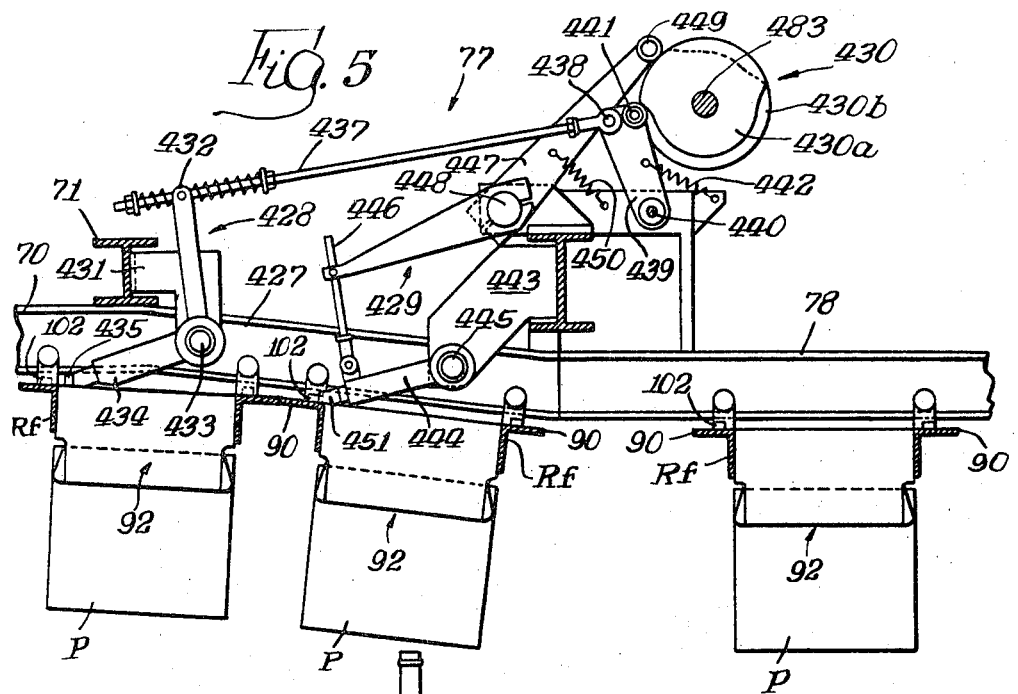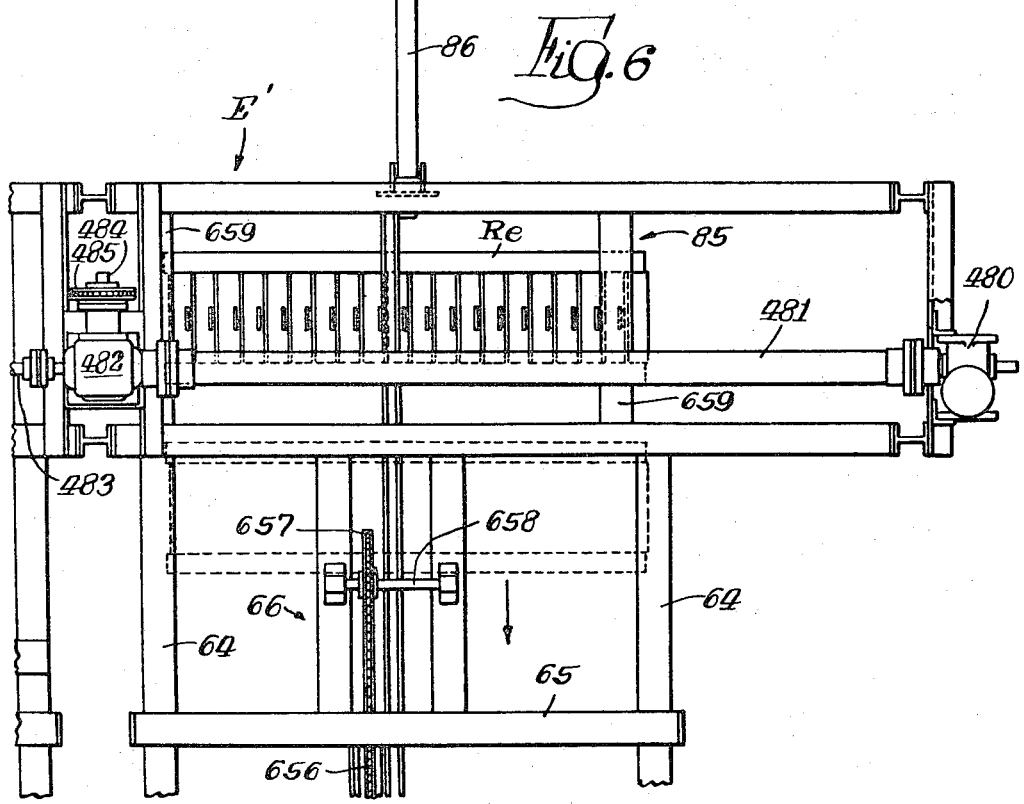

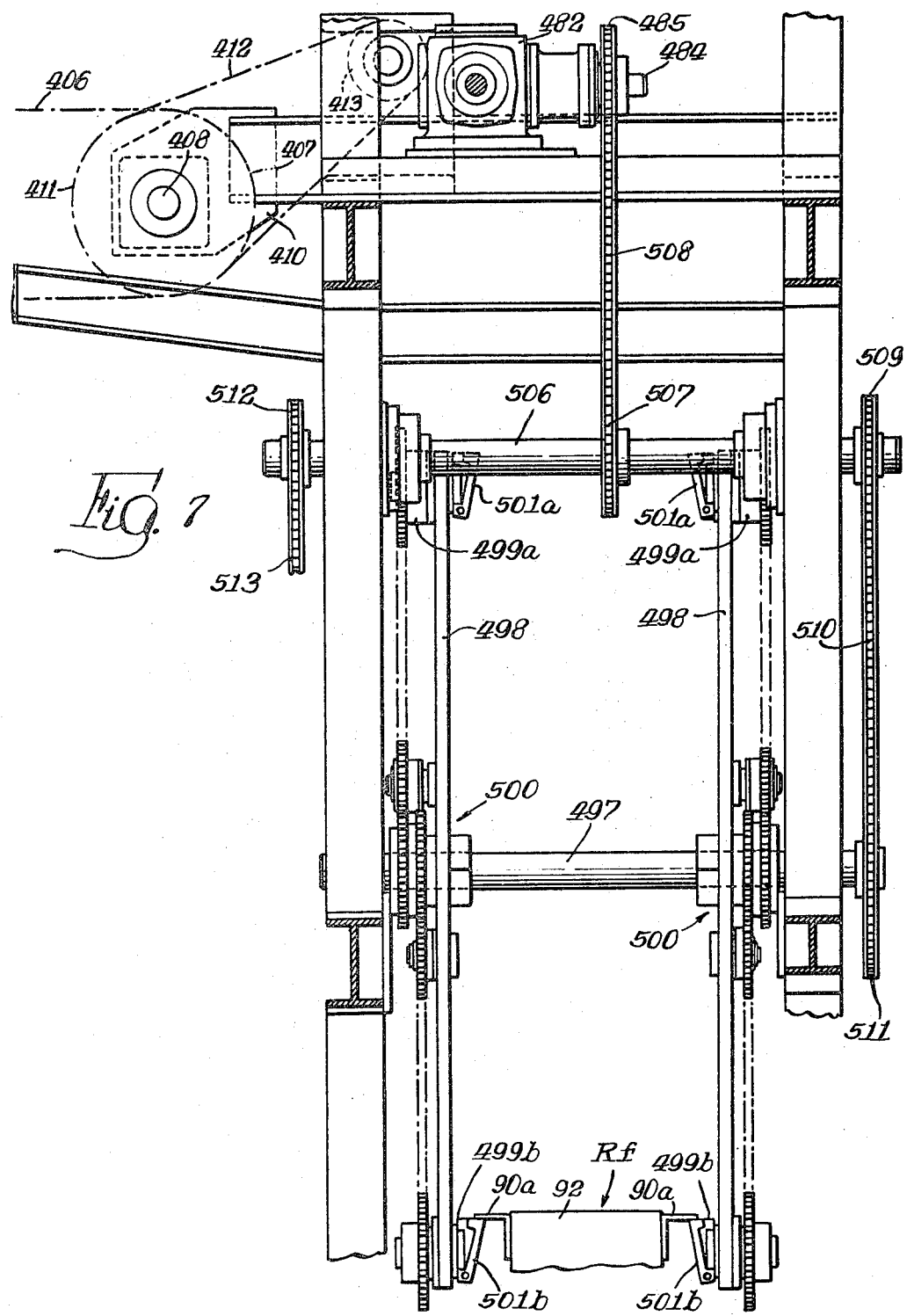

Sept. 24, 1968 — O. KILE — 3,402,839
APPARATUS FOR HANDLING PACKS OF PRINTED SIGNATURES
Original Filed March 22, 1962 — 14 Sheets-Sheet 7
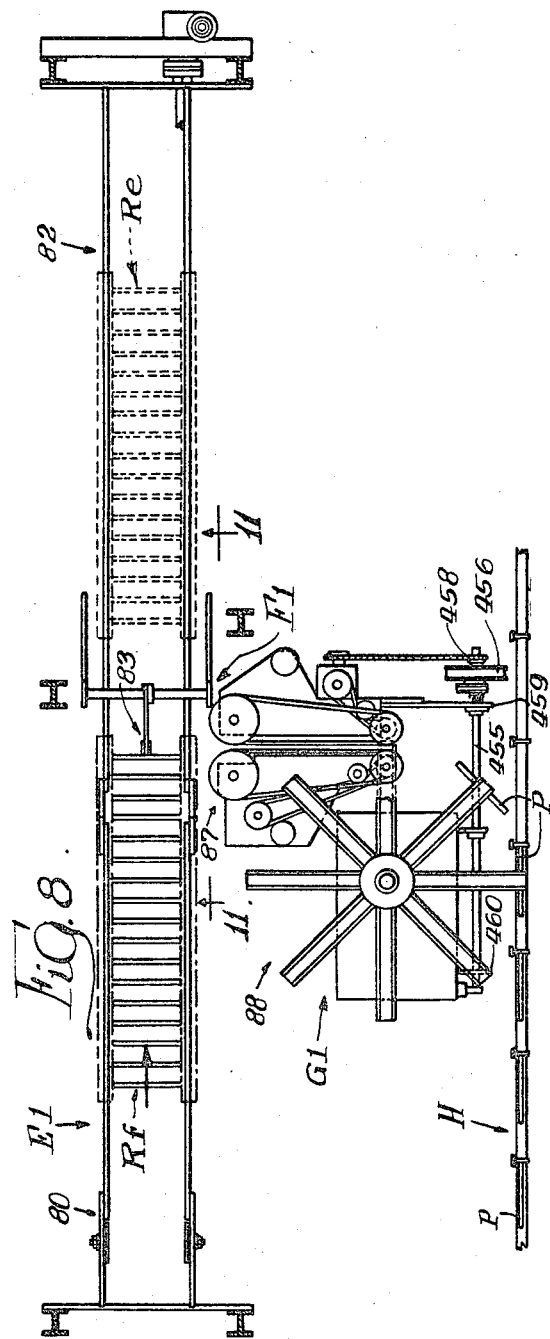

Sept. 24, 1968                    O. KILE                    3,402,839
APPARATUS FOR HANDLING PACKS OF PRINTED SIGNATURES
Original Filed March 22, 1962                    14 Sheets-Sheet 8
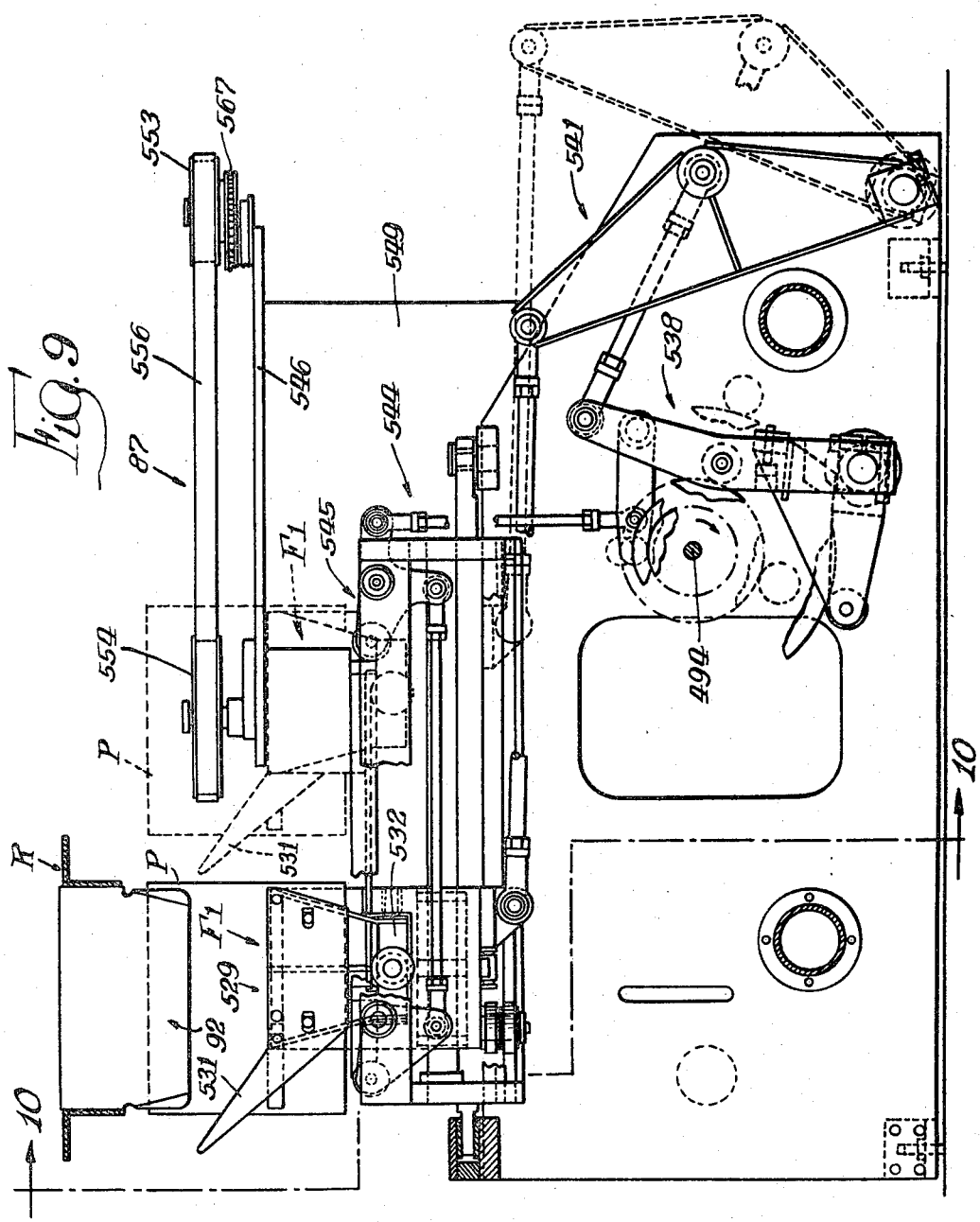

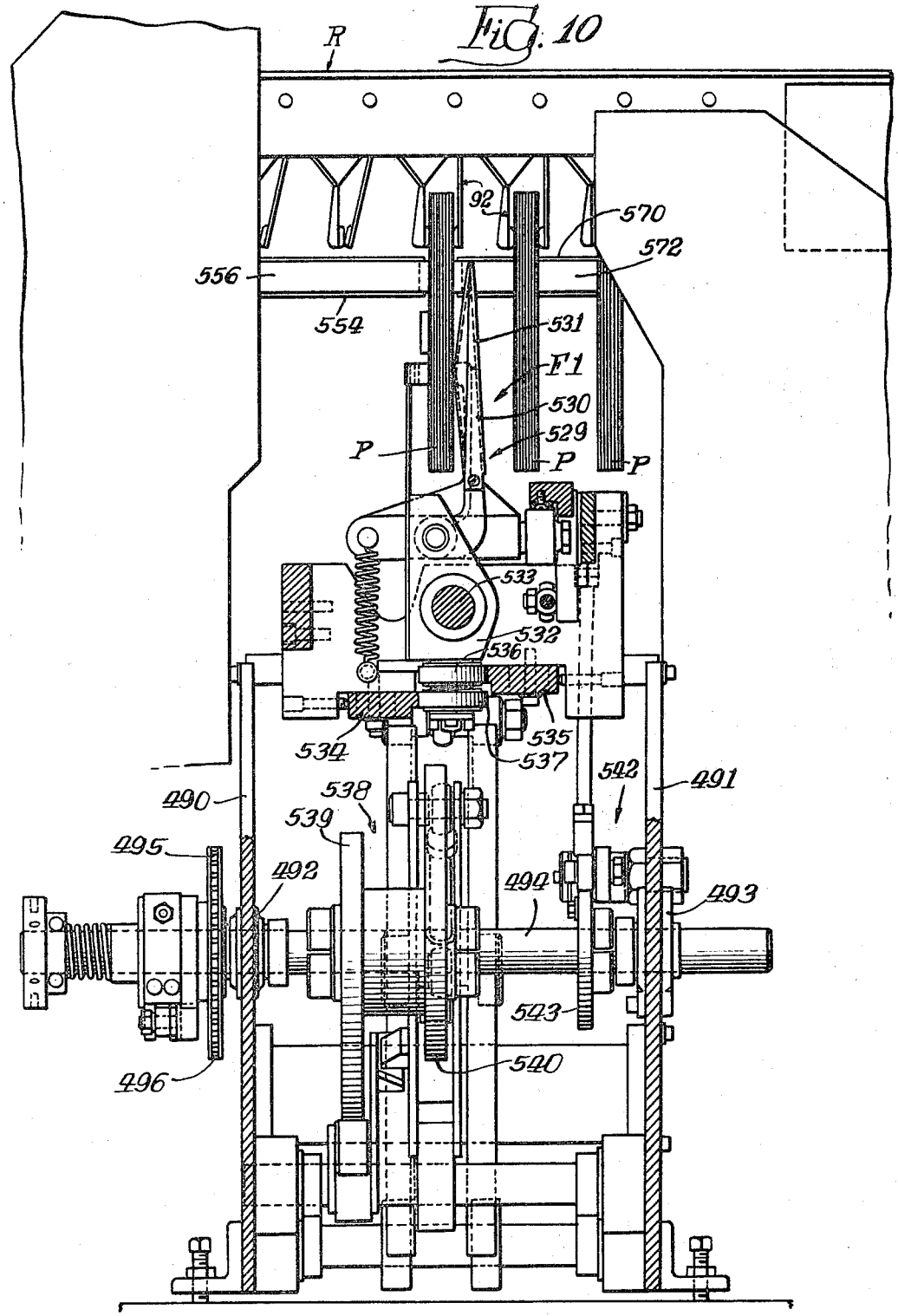

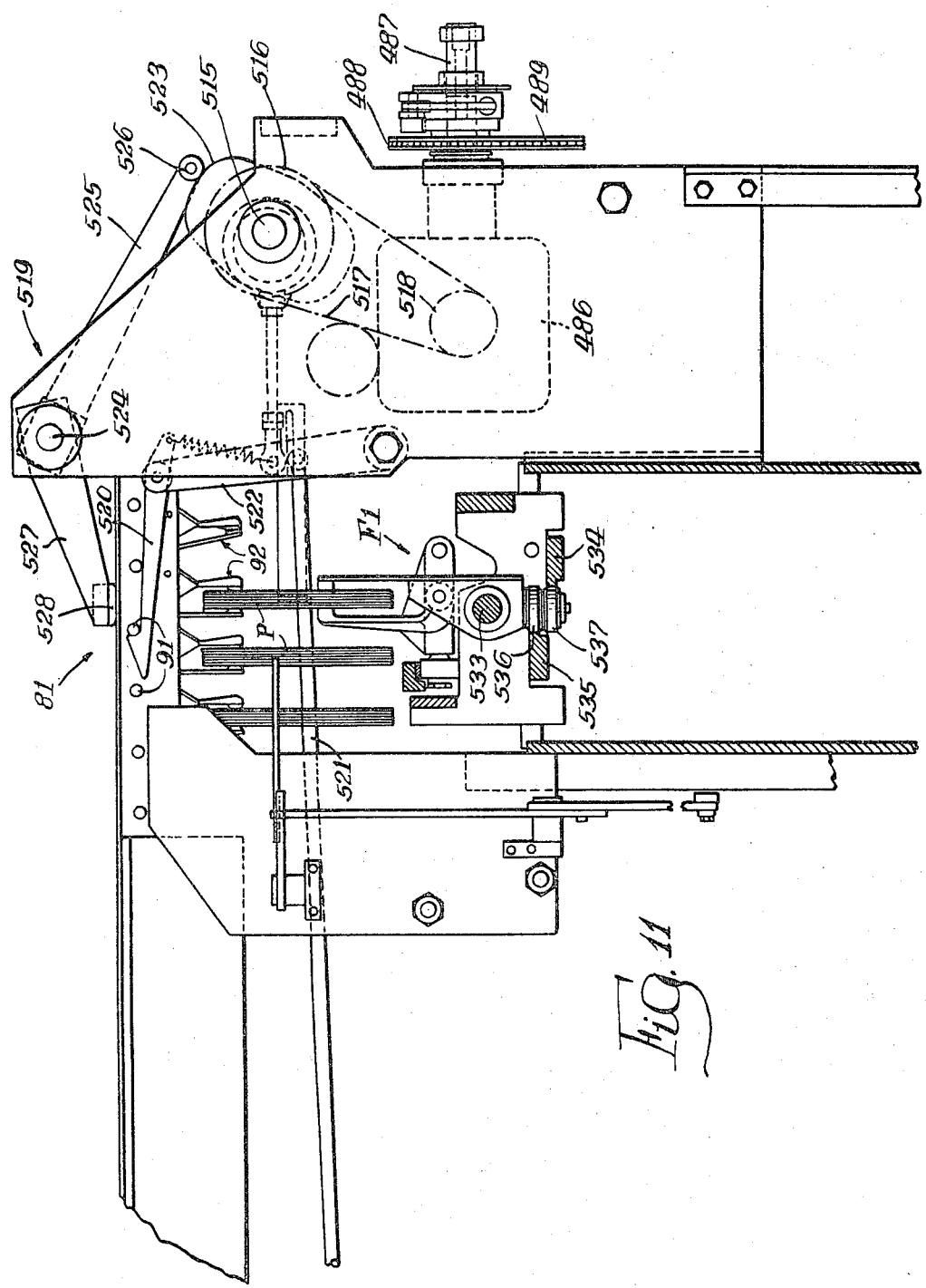

Sept. 24, 1968          O. KILE          3,402,839
APPARATUS FOR HANDLING PACKS OF PRINTED SIGNATURES
Original Filed March 22, 1962          14 Sheets-Sheet 11
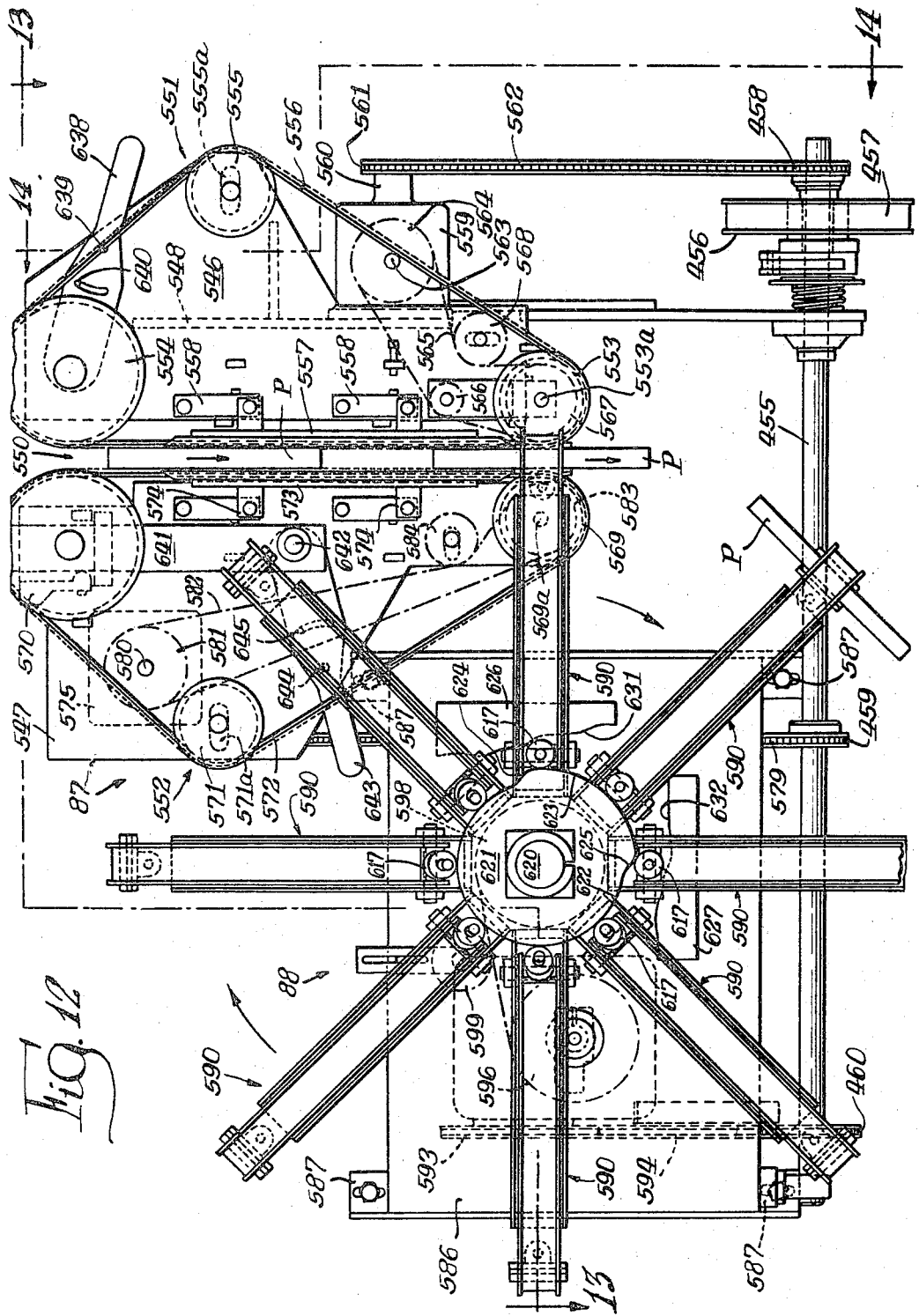

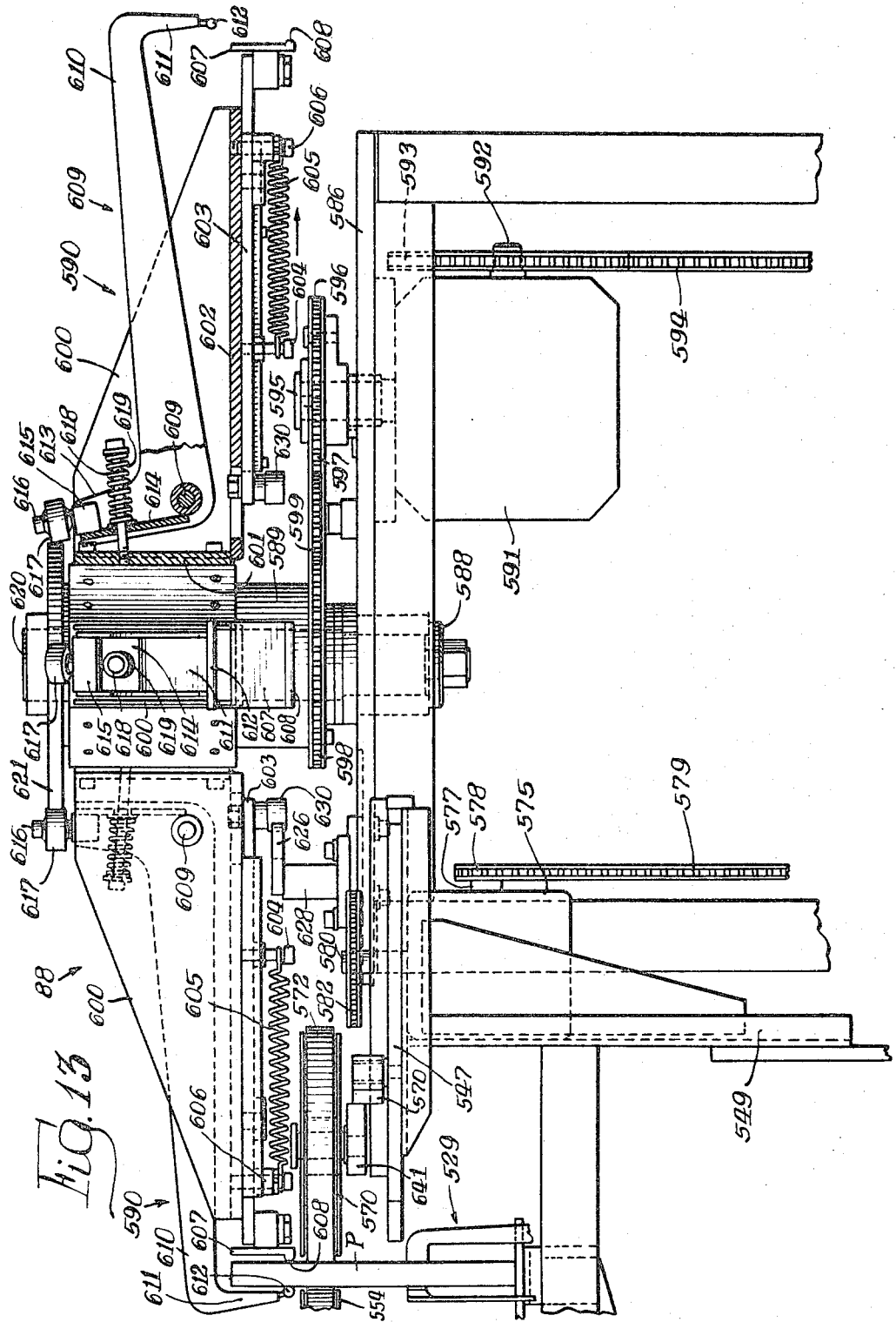

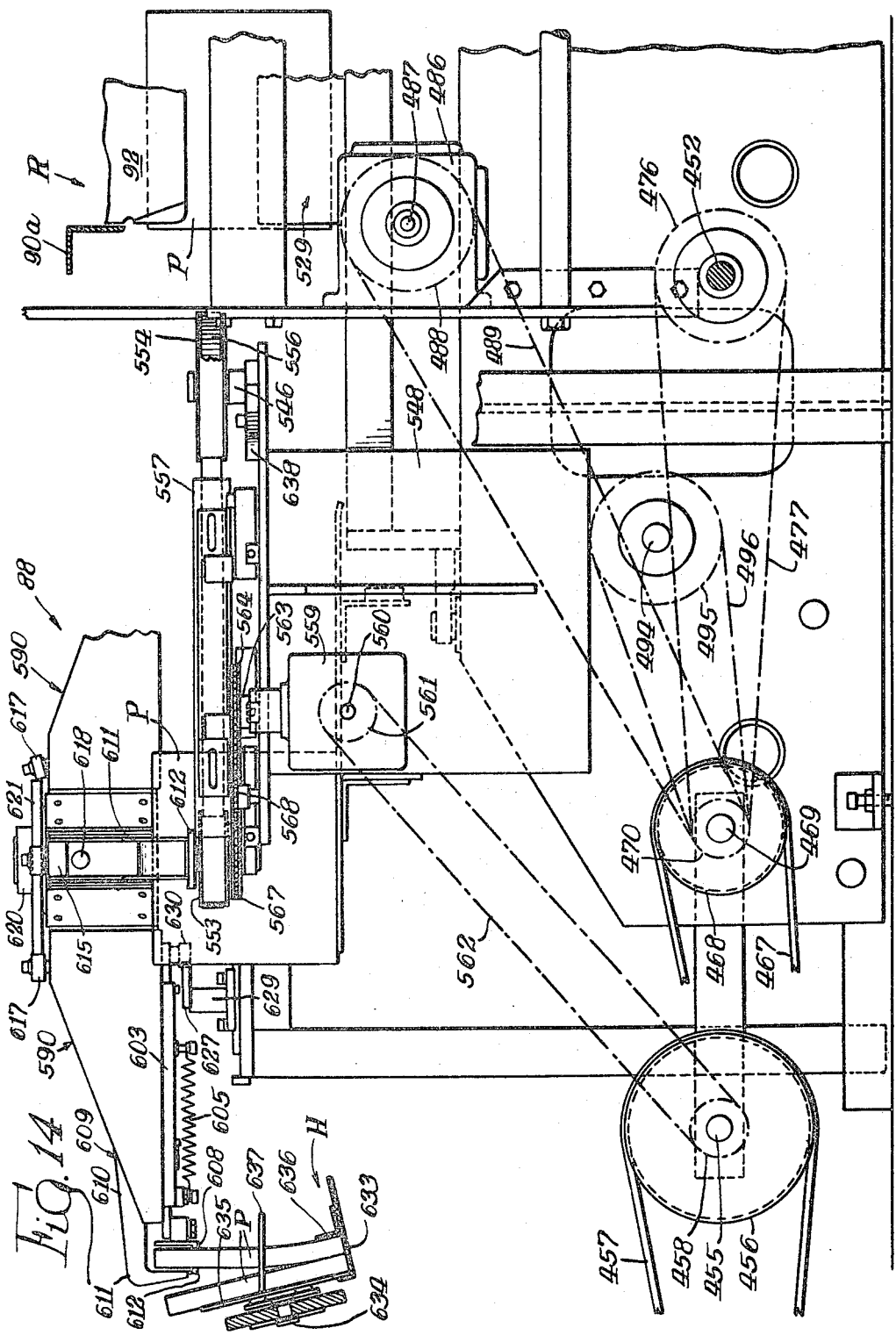

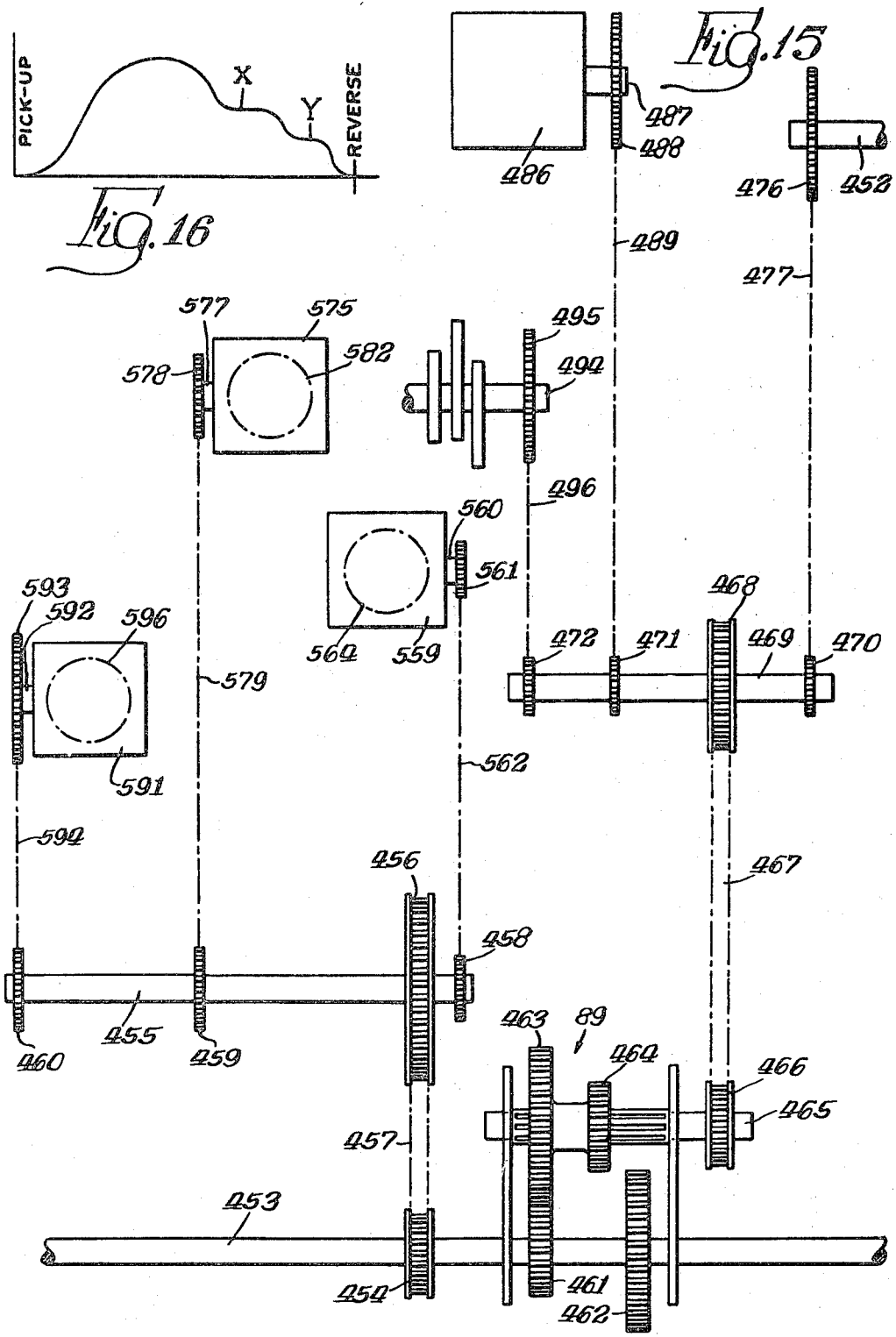

United States Patent Office 3,402,839
Patented Sept. 24, 1968

3,402,839
APPARATUS FOR HANDLING PACKS OF PRINTED SIGNATURES
Otho Kile, Homewood, Ill., assignor to R. R. Donnelley & Sons Company, a corporation of Delaware
Original application Mar. 22, 1962, Ser. No. 181,754, now Patent No. 3,206,043, dated Sept. 14, 1965. Divided and this application May 14, 1965, Ser. No. 455,841
14 Claims. (Cl. 214—309)

ABSTRACT OF THE DISCLOSURE

Apparatus for receiving storage and transfer racks which have clamps holding packs of printed signatures side-by-side, removing the packs from the racks seriatim and transferring them consecutively to a conveyor that feeds them to a binding machine.

---

This invention relates to an apparatus for and method of handling packs of printed signatures, and in particular it relates to apparatus which receives successive racks of signatures from a storage and transfer area, unloads the signatures from the racks, and transfers them to a supply conveyor of a binding machine. The present application is a division of my copending application Ser. No. 181,754, filed Mar. 22, 1962, which issued Sept. 14, 1965 as Patent No. 3,206,043.

A very serious problem in the publication of large catalogs such as those of the major mail order houses is caused by the large number of signatures which must be gathered and bound to form such catalog. A typical mail order catalog may require upwards of a hundred signatures; and the entire problem of gathering and binding the signatures is complicated by the fact that in a large mail order house each department commonly has its own catalog budget and provides the material for its own section of the catalog, so that the material which makes up a single catalog is originally in many different sized groups with colored sheets which must be scattered through parts of the catalog devoted to the various departments.

It is not practical to take groups of gathered signatures and store them in any ordinary fashion, because substantially perfect registration between signatures in a group must be maintained from the time they are gathered until the time they are bound; and no ordinary storage facilities assure the maintenance of such registration. One technique which has sometimes been used is to pre-gather a group of signatures and temporarily side-stitch them so that they may be stored until they are to be incorporated into the catalog. The principal difficulty with this system is that the stitching must be trimmed off before the signatures go to the patent binder.

On the other hand, if the system of pre-gathering groups of signatures is not used, and the equipment is set up to gather and bind an entire mail order catalog at one time, an enormously long gathering unit is required, containing anywhere from 90 to 132 boxes, most of which are used only twice a year when the large catalogs are bound.

Another major factor in attempting to gather an entire mail order catalog at one time is that any failure of a single box in the gathering unit will produce a defective catalog, and accordingly, the break-down of any one of the large number of boxes in the gathering unit requires a shut-down of the entire line. Operation of a single gatherer is particularly undesirable because the binder operates about twice as fast as the gatherer, and the use of the binder is at a very low level of efficiency.

In accordance with the present invention, two or three separate gathering machines may be used in the binding of a single large catalog, with two gatherers each handling 48 signatures and the third handling 36, to make a total of 132 signatures. If the catalog requires only 96 signatures only the first two gatherers are used. Each gatherer has its own storage section, to hold a predetermined number of gathered signatures, and operates independently of the other two gatherers. The storage section associated with each of the three gatherers provides a floating pool of packs of signatures, each pack being a partial catalog, and the packs are withdrawn from the storage pools at the speed of operation of the binder, with packs from all three pools being associated on a conveyor that feeds the binder and being moved into the binder together to be bound as a unit. Each storage section has a plurality of racks for storing packs of signatures side-by-side, and each pack of signatures is held in clamping jaws which maintain the necessary registration between signatures of the pack throughout the process of storage and delivery of the packs to the binder.

Establishment of pools of packs of signatures from each of the two or three gatherers assures that the binder may operate at top speed once the gatherers have been operated long enough to establish a backlog in the storage pools. It also assures that a temporary breakdown of one gatherer will not necessitate shutting down the other gatherers or the binder.

Since each storage pool has a capacity considerably larger than is usually required, it also permits continuing operation of the gatherers in the event the binder is shut down for any reason.

Furthermore, the present invention permits great flexibility in use of equipment, because the relatively short gatherers are entirely practical to use for the smaller, seasonal catalogs which are published between the semi-annual publications of the large catalogs. Thus, for example, when a small seasonal catalog is being gathered and bound the two 48 box gatherers may both be used; but where the signatures are fed from the storage racks into the conveyor which transports them to the binder the feed is modified so that the packs of signatures from the two gatherers go into the conveyor one behind the other with each pack of signatures forming a complete catalog. It is apparent that in this type of operation both gatherers are handling signatures which are identical and the packs of signatures are identical coming from the two gatherers. Conversely, in the case of the large semi-annual catalogs, the signatures gathered by the two or three gatherers, and consequently the packs of signatures issuing from the two or three gatherers, are all different; and the packs of signatures are placed on the binder conveyor in face abutting relationship so that they are bound into one catalog.

The principal object of the invention, therefore, is to provide an improved apparatus for and method of handling packs of printed signatures between the gatherers and the binder.

Another object of the invention is to provide an apparatus which will permit more efficient use of available floor space, more efficient use of the gathers, and more efficient use of the binder.

Still another object of the invention is to provide apparatus which may be operated to carry out either one of two alternative methods, thereby providing a degree of flexibility not heretofore obtainable.

Patent 3,206,043 discloses and claims the entire method of and apparatus for feeding packs of signatures to a loading station, loading them into the clamps in the storage and transfer racks, transporting the racks to an unloading station where the packs are removed from the racks and transferred consecutively to a conveyor that feeds them to a binding machine, and returning the empty racks to the loading station.

Patent 3,276,609, which also contains subject matter divided out of application 181,754 that issued as Patent 3,206,043, claims the apparatus for loading the storage and transfer racks.

The present application claims the apparatus for unloading the packs of signatures from the storage and transfer racks and transferring them to a conveyor that feeds them to a binding machine.

The invention is illustrated in a preferred embodiment in the accompanying drawings in which:

FIG. 1 is a diagrammatic plan view illustrating the general arrangement of the three gatherers, the storage pools for the three gatherers, loading stations at which packs of signatures from the gatherers are loaded into empty storage racks, unloading stations at which the packs of signatures are removed from the storage racks, the pack unloading and feeder mechanism at the unloading station, and the conveyor which delivers the packs of signatures seriatim from the feeder mechanism to the binder;

FIG. 2 is a diagrammatic perspective view of a single unit showing diagrammatically, or schematically the infeed for packs of signatures, the loading station, the unloading station, the empty rack return mechanism which stores and continuously returns empty racks to the loading station, the full rack forwarding mechanism which stores and continuously forwards full racks to the unloading station, the pack unloading and feeder mechanism, and the conveyor mechanism for delivering the packs of signatures seriatim from the feeder mechanism to the binder;

FIG. 5 is a fragmentary section on an enlarged scale taken substantially as illustrated along the line 5—5 of FIG. 4, illustrating the rack forwarding escapement mechanism;

FIG. 6 is a fragmentary plan view taken substantially as illustrated along the line 6—6 of FIG. 4;

FIG. 7 is a fragmentary section on an enlarged scale taken substantially as illustrated along the line 7—7 of FIG. 4;

FIG. 8 is a sectional view on a reduced scale taken substantially as illustrated along the line 8—8 of FIG. 4;

FIG. 9 is a fragmentary section on an enlarged scale taken susbtantially as illustrated along the line 9—9 of FIG. 4;

FIG. 10 is a fragmentary section on an enlarged scale taken substantially as illustrated along the line 10—10 of FIG. 9;

FIG. 11 is a fragmentary section on an enlarged scale taken substantially as illustrated along the line 11—11 of FIG. 8;

FIG. 12 is a plan view of the pack unloader and conveyor feeder;

FIG. 13 is a fragmentary section on an enlarged scale taken substantially as illustrated along the line 13—13 of FIG. 12, with parts omitted for clarity;

FIG. 14 is a fragmentary section taken substantially as illustrated along the line 14—14 of FIG. 12;

FIG. 15 is a diagrammatic showing of the power transmission system at the unloading end; and FIG. 16 is a speed curve of the unloading means.

*General description of apparatus and system*

Figure 1:
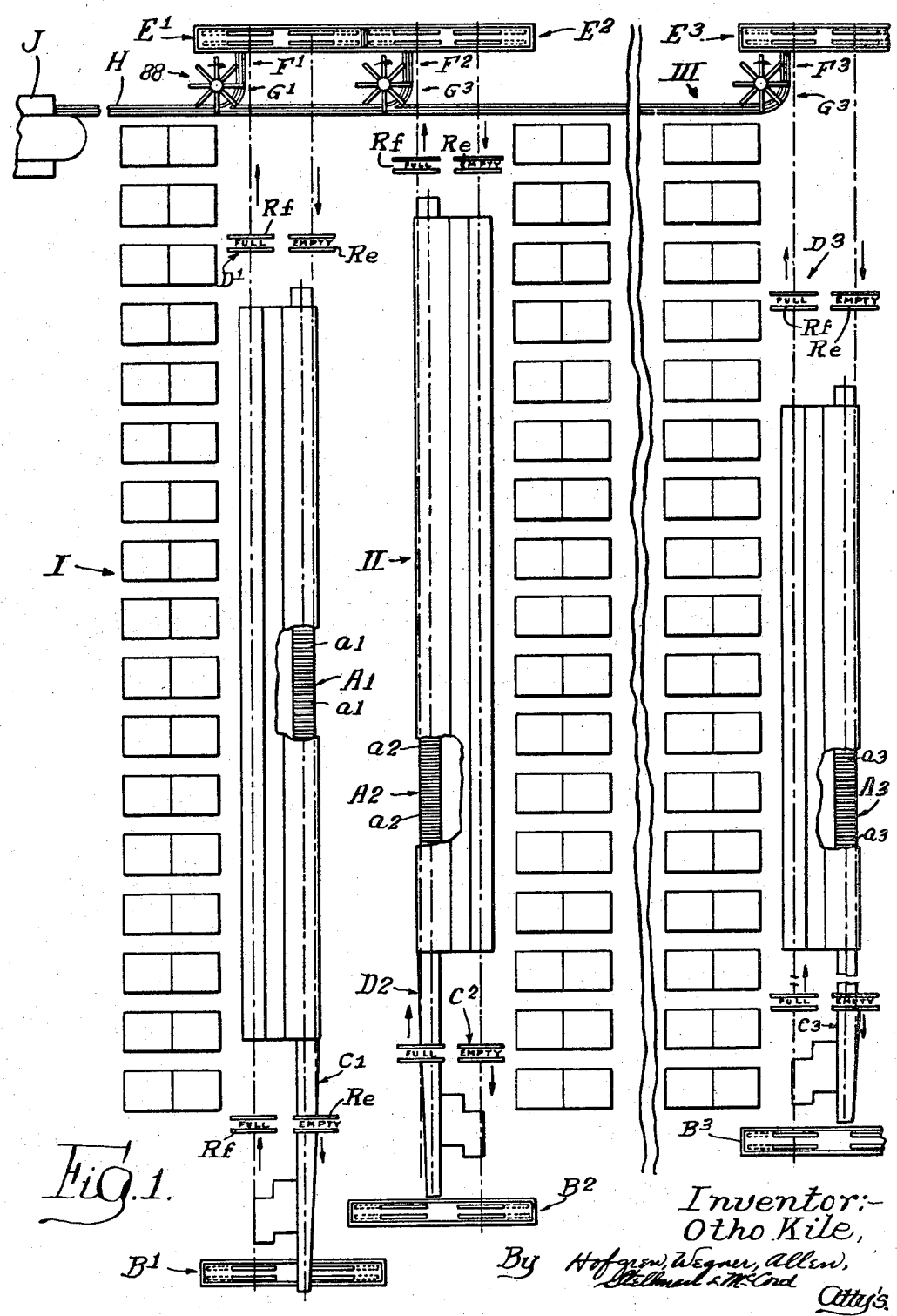

Referring first to FIG. 1 of the drawings, there are diagrammatically illustrated three separate units, indicated generally at I, II and III, and said units are provided, respectively, with conventional gathering machines A1, A2 and A3. The gathering machines have the usual signature receiving boxes which are diagrammatically illustrated and are numbered, respectively, a1, a2 and a3 for the three gathering machines A1, A2 and A3. Being a diagrammatic view FIG. 1 does not show the actual number of boxes in the three gathering machines; but as previously stated herein the gathering machines A1 and A2 may have 48 boxes each, while the gathering machine A3 may have 32 boxes. As is well known in the art, a gathering machine has different signatures in each box, and gathers signatures from the several boxes into a single pack which may then go to a binding machine.

Figure 2:
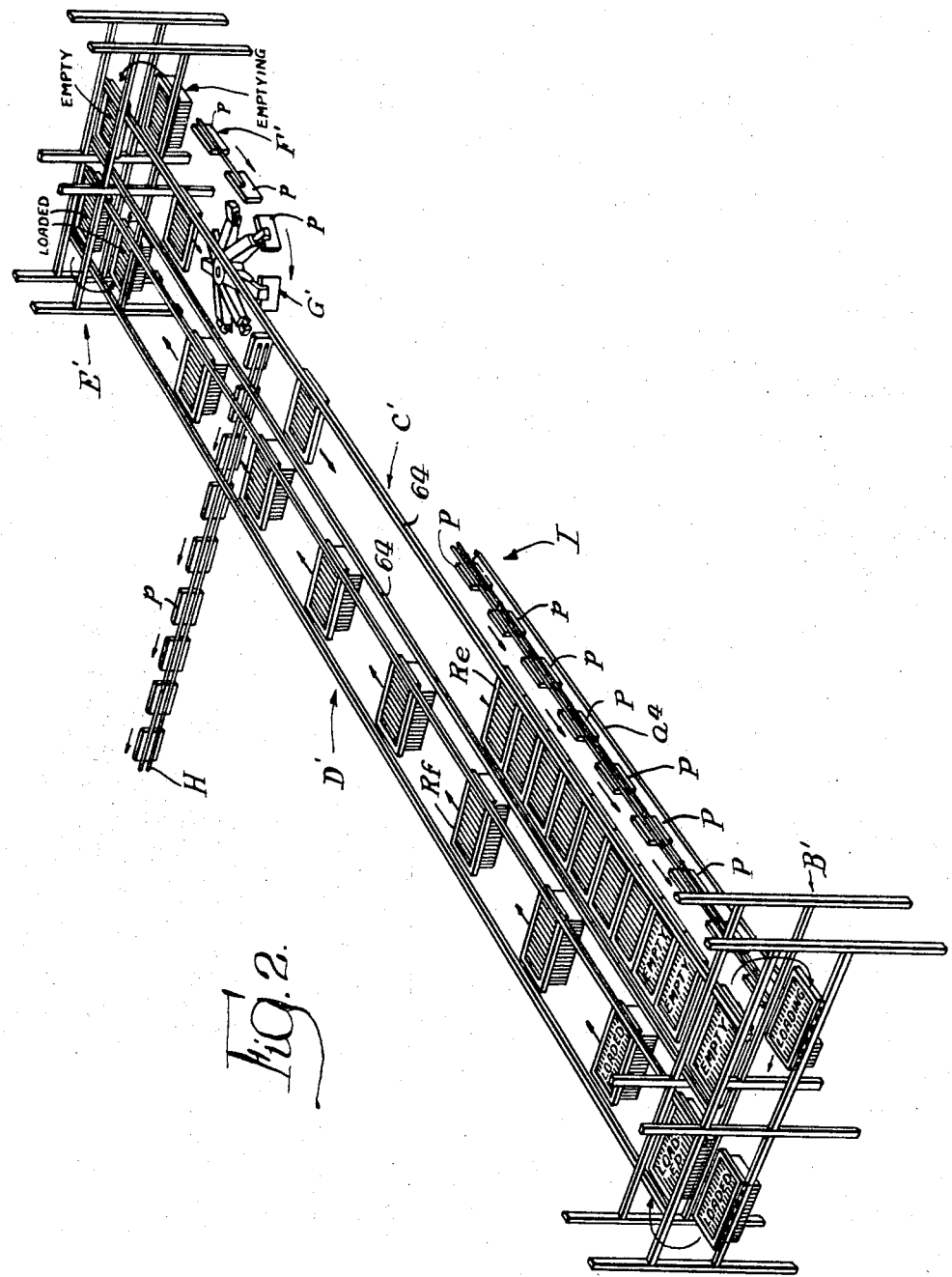

Each of the gathering machines includes a conventional signature pack delivery conveyor, indicated as a4 in FIG. 2, which moves signature packs P seriatim in evenly spaced relationship with the signatures in each pack jogged into the necessary register for binding and with each pack supported on edge.

Each of the units I, II and III includes the same major components, and in the following general description only the components of the unit I will be specifically referred to, while in FIG. 1 the identical major components of the units II and III will be designated by the same reference letters combined with unit identifying numerals as in the case of the gatherers A1, A2 and A3.

As seen in FIGS. 1 and 2, the unit I has a loading station B1 toward which the packs P of signatures are transported by the pack conveyor a4, and the loading station B1 is adapted to receive empty signature pack storage and transfer racks Re which are carried in an overhead storage and return mechanism C1 which moves the empty racks Re toward the loading station. Full racks Rf are moved from the loading station B1 into a full rack storage and forwarding means D1 in which the racks full of signature packs are moved toward an unloading station E1. At the unloading station E1 the racks are moved one at a time through the unloading station, where unloading means F1 takes the packs P seriatim from the racks and passes them to a conveyor feeder, indicated generally at G1, which in turn deposits the packs upon a pack conveyor H for travel into a binding machine J. As seen in FIG. 1, the pack conveyor H may receive packs of signatures from the signature feeder G1 of the unit I, and also from the signature feeder G2 of the unit II, and the signature feeder G3 of the unit III.

It is clear from FIG. 2 that the storage and return means C1 and the storage and forwarding means D1 each has adequate storage space for a large number of the racks, and thus the storage and forwarding means D1 provides facilities for forming a storage pool of packs of signatures carried in the full racks Rf, so that a breakdown of the gatherer A1 ordinarily need not cause a shutdown of the binder J. Conversely, there is usually enough space in the storage and forwarding means D1 to receive full racks from the loading station B1 even though the binder J may be temporarily shut down, thus ordinarily permitting continuous use of the gatherer A1. Similar considerations apply to the units II and III.

As will be described in more detail hereinafter, the unloading means, the conveyor feeders, and the pack conveyor, the complete system disclosed in the present application affords a great deal of flexibility in operation. When a large catalog is being prepared which requires in excess of 48 signatures, packs of 48 signatures are made up by the gathering machine A1 to form a part of the catalog. If no more than 96 signatures are required for the complete catalog, all the additional signatures are made into packs by the gatherer A2; while if more than 96 signatures are required the gatherer A3 is also employed. In this mode of operation, of course, all the signatures are different, so the packs in each unit are different from those in the other units. The pack conveyor H first receives a pack of signatures from the unit III, the pack of signatures from the unit II is placed on the pack conveyor H in face abutting relationship to the pack from the unit III, and finally the pack from the unit I is placed against the pack from the unit II so that all of the signatures for a single catalog, consisting of the three separate packs, are on the pack conveyor H in the required position to be bound into a single catalog by the binding machine J.

As previously pointed out, binder J has a maximum rate of operation approximately twice that of either of the gatherers, and if a small catalog is being prepared which requires no more than 48 signatures the gatherer A1 and the gatherer A2 may both be used to gather identical packs of signatures. Operation of the unloading stations E1 and E2, the unloading means F1 and F2, and the conveyor feeders G1 and G2 is then modified so that the pack conveyor H receives signature packs alternately from the feeder G1 and the feeder G2. The means of accomplishing this change of operation, which may be described as a change from two-up delivery to one-up delivery, will be described in detail hereinafter.

*General description of the full rack storage and forwarding means D1*

Figure 3:
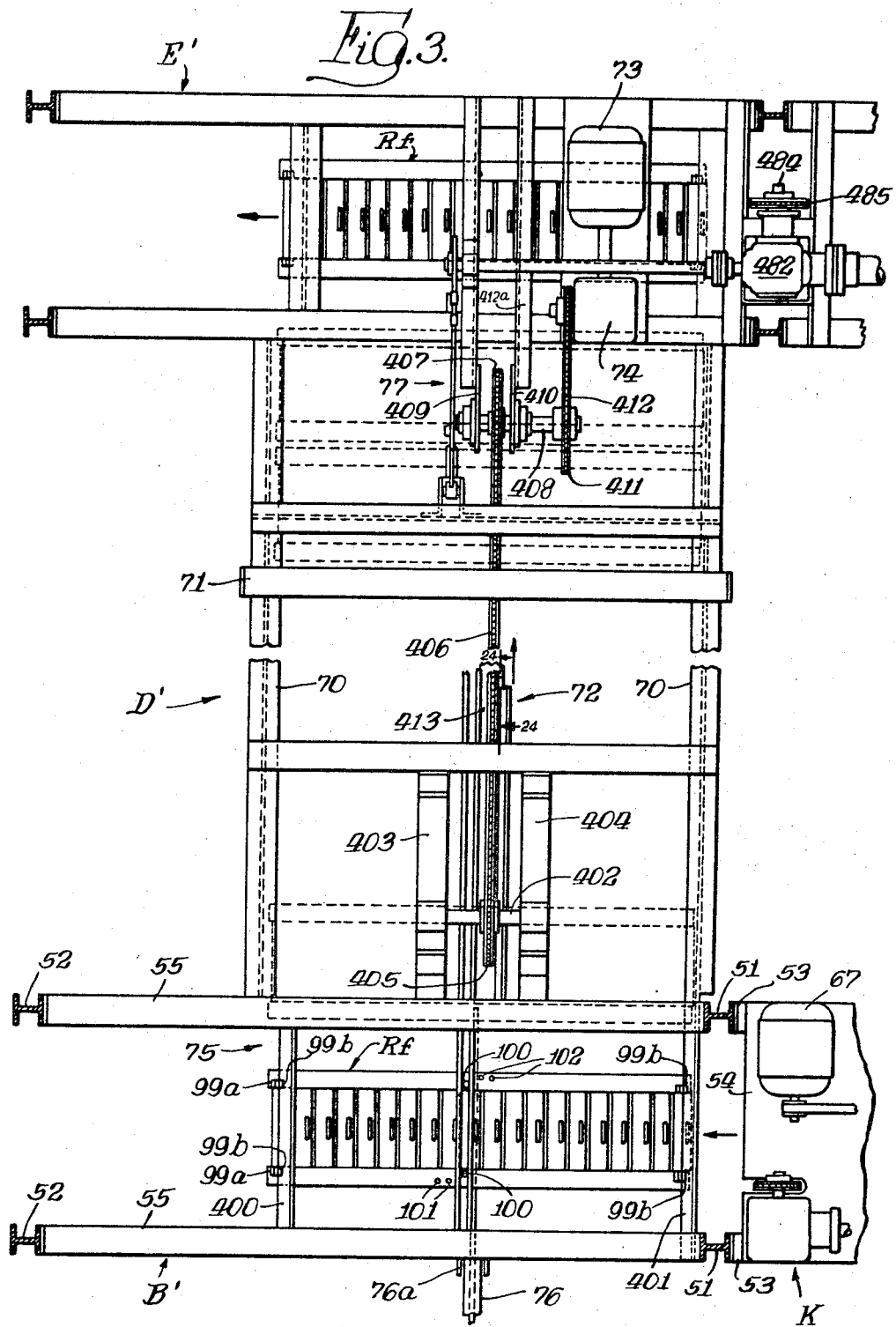
FIG. 3 is a fragmentary plan view of one loading station, one unloading station, and with the central area of the full rack storage and forwarding means broken away.

The full rack storage and forwarding means D1 is seen in FIG. 3 to include parallel rack supporting rails 70 which are suspended from the ceiling by suitably spaced hanger brackets 71, and which extend continuously from the loading station B1 to the unloading station E1. The storage and forwarding means D1 also includes a power and free conveyor, indicated generally at 72, which is driven by a motor 73 through a speed reducer 74.

The storage and forwarding means D1 also includes an escapement, indicated generally at 77 in FIG. 3, the mechanism of which is illustrated in detail in FIG. 5. Escapement mechanism 77 operates to release the full racks Rf one at a time from the storage and forwarding means D1 onto rack positioning rail sections 78 from which they are lowered into the unloading station E1 by rotary arms, indicated generally at 79, in said station.

For a detailed description of the apparatus other than the unloading station, the unloading means, and the conveyor feeder system, see Patent 3,206,043.

*General description of unloading station E1, unloading means F1, and conveyor feeder G1*

Referring now particularly to FIGS. 4 to 16, inclusive, the full rack lowering arms 79, are positioned to remove the racks from the positioning rails 78 and lower them into an infeed end 80 of the unloading station. Rack unloading transfer means, indicated generally at 81 in FIG. 11, advances the full racks successively through the unloading station to an outfeed end 82 of the station, and as the packs P arrive at an unloading position 83 the packs are removed by the unloading means F1, which is substantially identical with the loading means N, so that the rack is empty when it reaches the outfeed end 82 where it is picked up by empty rack elevating arms, indicated generally at 84, and deposited in an empty rack receiving mechanism, indicated generally at 85. The receiving mechanism 85 includes a hydraulic plunger 86 which pushes the empty racks one at a time from the receiving mechanism 85 into the grip of the power and free conveyor 66.

As best seen in FIG. 12, the conveyor feeder means includes both a feeder belt unit, indicated generally at 87, which receives packs from the unloading means F1, and an eight armed rotating head, indicated generally at 88, which receives packs from the unit 87 and deposits them on the pack conveyor H. Each arm of the rotating head has cam controlled jaws which grip a pack P before it leaves the feeder belt unit 87. When the rotation of the head 88 has moved the arm carrying any particular pack P 90° from the feeder belt unit 87 its jaws are opened and the pack is released on the continuously moving pack conveyor H for travel into the binding machine J.

The rack unloading transfer mechanism 81, the reciprocating clamp mechanism 87, and the rotating head 88 are all driven from the same motor which operates the binding machine J and the pack conveyor H, so that these elements are always operated in timed relationship.

When a large catalog is being produced requiring signature packs from the unit I and the unit II, and perhaps the unit III, the unloading transfer mechanism 81 and the unloading means F1 are driven at a predetermined speed, and a pack P is delivered by the belt unit 87 to each of the eight arms of the rotating head 88.

In the preparation of a small catalog requiring no more than 48 signatures, a gear shift mechanism, indicated generally at 89 in FIG. 15, is operated to drive the unloading transfer mechanism 81 and the unloading means F1 at half speed, while the belt unit 87 and rotating 88 are driven at full speed. The control cams for operating alternate jaws of the rotating head 88 are disabled to take those jaws out of operation, and only the four operating sets of jaws receive packs P. Furthermore, the rotating head 88 is shifted bodily toward the pack conveyor H so that, instead of depositing a pack P at a position on the conveyor H which will place it against a pack already on the conveyor, each pack is deposited upon the conveyor in contact with inclined supporting means of the conveyor H which retains the pack in inclined position. In this mode of operation, successive pack receiving stations of the conveyor H receive packs alternately from the conveyor feeder G1 and from the conveyor feeder G2.

*Detailed description of drive system for escapement 77, full rack lowering arms 79, empty rack elevating arms 84, full rack transfer mechanism 81, unloading means F–1, belt unit 87 and rotary head 88*

FIG. 15 is a diagrammatic view of the entire power transmission system for the above identified components, and may be correlated with the various parts of said power transmission system which are also illustrated in FIGS. 4 and 8–14 inclusive.

As previously stated, coordination of all of the unloading components with the binder J makes it desirable to drive all said components from the same motor that drives the binder. Accordingly, a line shaft 453 extends from the binder continuously parallel to the pack convoyer H and past the unloading stations E–1, E–2, and E–3 to provide power for all the components of all three stations. A large serrated timer pulley 454 is mounted on the line shaft 453, and a jack shaft 455 for driving the belt unit 87 and rotating head 88 carries a similar pulley 456, and a tooth timer belt 457 is trained around the pulleys 454 and 456. As seen in FIGS. 15 and 8 and 12, a pair of sprockets 458 and 459 on the jack shaft 455 provide a power take-off for the two sides of belt unit 87, while the rotating turret 88 is driven from a sprocket 460 on the jack shaft.

The gear shift 89, previously referred to, includes a pair of input gears 461 and 462 of different sizes on the line shaft 453, and output gears 463 and 464 on a sliding shaft 465 by means of which the gear 463 is in mesh with gear 461, as illustrated, or the gear 464 may mesh with the gear 462 to provide a rate of rotation of the sliding shaft 465 which is one-half that in the first arrangement. Slidably keyed to the shaft 465 is a sprocket 466 from which a chain 467 is trained around a sprocket 468 on an intermediate distributor shaft 469. A sprocket 470 on the distributor shaft 469 provides the power input for the rack handling drive 452, a second sprocket 471 on the distributor shaft 469 provides the power input for the rack unloading transfer means 81 (see FIG. 11) while a third sprocket 472 on the distributor shaft 469 provides the power input for the rack unloading apparatus F1.

Figure 4:
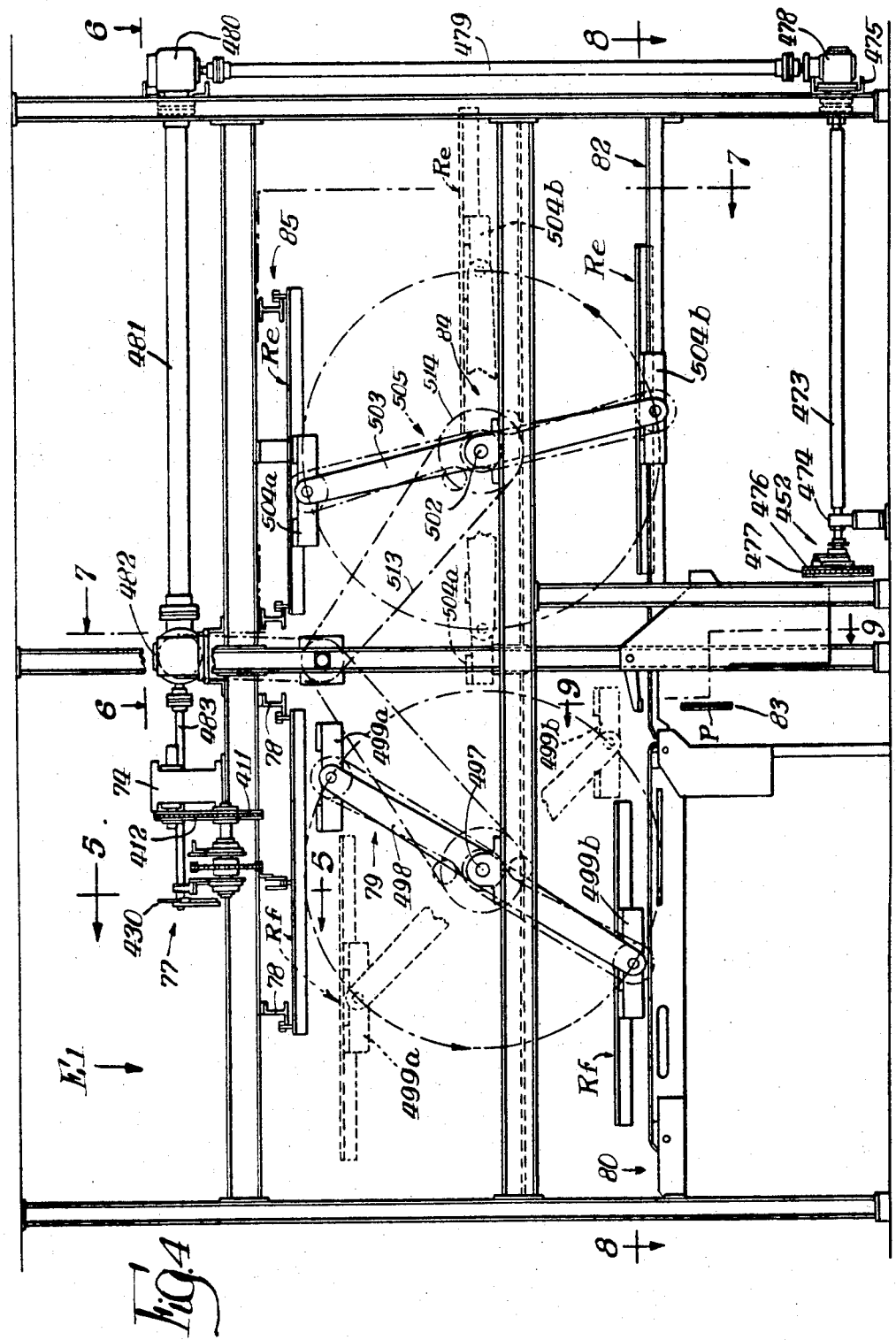
FIG. 4 is an elevational view of the unloading station, viewed from beneath the storage means, and with the unloading mechanism and the pack conveyor feeder omitted for clarity of illustration.

Referring now to FIG. 4, the rack handling power train 452 includes a bottom shaft 473 which is journalled on brackets 474 and 475 and carries a sprocket 476 which is aligned with the sprocket 470 on shaft 469 to receive a roller chain 477 which is trained over said sprocket 470.

The shaft 473 drives a miter gear box 478 which is also mounted on the bracket 475, and from the miter gear box 478 an upright shaft 479 at the outfeed end of the unloading station E1 in turn drives a miter gear box 480 at the top of the unloading station; and an upper horizontal shaft 481 from miter box 480 drives a gear box 482. The gear box 482 has a first shaft 483 the outer end of which carries the cam unit 430 of the escapement mechanism 77. A second output shaft 484 of gear box 482 carries a sprocket 485 from which the full rack lowering arms 79 and empty rack elevating arms 84 are driven (see FIGS. 6 and 7).

As best seen in FIG. 11, a gear box 486 provides the power input for the rack unloading transfer means 81 and has an input shaft 487 carrying a sprocket 488 for a chain 489 which is also trained around sprocket 471 on distributor shaft 469.

As best seen in FIGS. 9 and 10, a pair of supporting plates 490 and 491 carry bushings 492 and 493 in which a cam shaft 494 of the unloading means F–1 is journalled, and a sprocket 495 on said cam shaft carries a roller chain 496 which is also trained around the sprocket 472 of distributor shaft 469.

*Detailed description of unloading station E–1, full rack lowering arms 79 emply rack elevating arms 84, rack unloading transfer means 81, and rack unloading mechanism F–1*

All of the major components which are described in detail at this point are illustrated in FIGS. 4 and 8 to 11. The components will be described in relatively general terms, because except for the drive, which has already been traced in detail, these components are substantially identical with those in the loading station B–1, and both the operating mechanisms and the modes of operation are the same.

Referring first to FIG. 7, the rack lowering arms 79 include a rotating supporting shaft 497 and parallel arms 498 at the ends of which are rack carriers 499a and 499b. Rack carrier orienting means, indicated generally at 500, maintains the rack carriers 499a and 499b in a horizontal position as the arms 498 rotate. The rack carriers 499a and 499b are provided, respectively, with rack supporting latch means 501a and 501b, upon which the rack flanges 90a are supported as a rack is lowered on the arms 79.

Similarly, the rack elevating arms 84 include a rotating shaft 502, parallel arms 503 on the shaft, and rack carriers 504a and 504b which are maintained in a horizontal orientation as the arms rotate by orienting means, indicated generally at 505, which is identical with the orienting means 500. The rack carriers 504a and 504b also have rack supporting latches (not shown) )upon which the flanges of an empty rack are supported.

A drive shaft 506 for the lowering arms 79 and elevating arms 84 carries a sprocket 507 from which a chain 508 is trained around the sprocket 485 on output shaft 484 of the gear box 482. On the right-hand end of the shaft 506, as viewed in FIG. 7, is a sprocket 509 for a drive chain 510 which is trained around a sprocket 511 on the rotating shaft 497 of the rack lowering arms 79; while at the left-hand end of the shaft 506, as viewed in FIG. 7, is a sprocket 512 for a drive chain 513 which is trained around a sprocket 514 on the rotating shaft 502 of the rack elevating arms 84.

Referring now to FIG. 11, an eccentric shaft 515 for rack unloading transfer means 81 carries a sprocket 516 for a drive chain 517 which is also trained over a sprocket 518 of gear box 486 to drive the transfer means and operate a rack jaw actuating mechanism, indicated generally at 519.

The rack unloading transfer means 81 includes a pair of pawls, such as the pawl 520 in FIG. 11, which are reciprocated by a pair of eccentrics on shaft 515 which are 180° out of phase of one another so that the pawls pull alternately on the projecting ends of cross pins 91 at the two sides of rack R to advance the rack stepwise through the unloading station. A long connecting rod 521 links a rocker arm 522 for the pawl 520 to a pair of preliminary rack advancing hooks (not shown) which are identical to those heretofore described in conjunction with the loading station B–1.

The rack jaw actuating means 519 of the unloading station differs from the jaw actuating means at the loading station in that an operating cam 523 for the rack actuating means is mounted directly upon the eccentric shaft 515 (instead of on a separate cam shaft driven from an eccentric shaft), and a rock shaft 524 carries a follower arm 525 with a follower roller 526 bearing on cam 523, and also carries a jaw actuating arm 527 having a bearing pad 528 which bears upon the bearing pads 96 of the rack jaws 92 to open said jaws and release a pack of signatures to be picked up by the unloading means F–1.

Referring now to FIGS. 9 and 10, the unloading means F–1 is substantially identical with the loading means N, and includes reciprocating clamp means 529 having a fixed clamp member 529a and a movable clamp member 530 of which has an inclined pack stabilizing arm 531 the upper end of which is seen to be only slightly below the lower margin of the rack jaws 92.

The reciprocating clamping means 529 includes a carriage 532 which is supported upon a rod 533 and stabilized between rails 534 and 535 by means of rollers 536 and 537; and the carriage 532 is reciprocated by a conjugate cam and link apparatus, indicated generally at 538 which has conjugate cams 539 and 540 mounted upon cam shaft 494, and an operating linkage, indicated generally at 541, for reciprocating the carriage 532.

Opening and closing of the clamp means is controlled by a cam and link mechanism, indicated generally at 542, which includes a control cam 543 on the cam shaft 494, and a connecting linkage 544 for rocking a parallelogram type linkage, indicated generally at 545, which operatively engages a portion of the movable clamp member 530 to open and close the clamps.

*Detailed description of rack feeding means G–1, including belt unit 87 and rotating head 88, and pack conveyor belt H*

The conveyor feeder G–1, including both the belt unit 87 and rotating head 88, are best seen in FIGS. 12 to 14, and since no similar mechanism is found at the loading station B–1, these components will be described in detail. Details of the Pack Conveyor H are seen only in FIG. 14.

Referring first to FIGS. 33 and 35, the belt unit 87 is seen to include a platform 546 and a platform 547 which are mounted upon suitable brackets 548 and 549, and there is a pack receiving slot 550 between said platforms which is aligned with the unloading position 83 and with the reciprocating clamps 529. Cooperating belt means, indicated generally at 551 and 552, are mounted, respectively, upon the platforms 546 and 547. The belt means 551 includes a fixed drive pulley 553 on an input shaft 553a, an adjustable pulley 554 and a removable pulley 555. The three pulleys are serrated to receive a timer belt 556 which has a straight run along one side of slot 550 where it is backed up by a guide plate 557 which is carried on brackets 558 on the platform 546. A gear box 559 mounted on bracket 548 has an input shaft 560 provided with an input sprocket 561 to receive a chain 562 which is trained around sprocket 458 on jack shaft 455. An upstanding output shaft 563 on gear box 559 extends through platform 546 and carries a serrated pulley 564; and a toothed drive belt 565 is wrapped around the pulley 564, passes outside an idler pulley 566, around an input sprocket 567 on the input shaft 553a, and is back wrapped around an adjustable tensioning pulley 568 which is also supported upon platform 546.

The belt means 552 is similar to the belt means 551, and includes a fixed drive pulley 569 on an input shaft 569a, an adjustable pulley 570, and a removable pulley 571, with a timer belt 572 trained around said three pulleys and having a straight run along the opposite side of slot 550 from the straight run of belt 556. In said straight run the belt 556 is backed up by a guide plate 573 which is carried on brackets 574 on the platform 547.

The drive for belt means 552 is derived from a gear box 575 which is mounted upon the bracket 549, and the gear box 575 has a input shaft 577 provided with a sprocket 578 for a drive chain 579 which is trained around the sprocket 459 on the jack shaft 455. An upright output shaft 580 on the gear box 575 extends upwardly through platform 547 and carries a serrated pulley 581 from which a timer belt 582 is wrapped around a serrated pulley 583 on the input shaft 569a. The timer belt 82 also back wraps an adjustable tensioning pulley 584.

As shown by the solid and broken line showings of the reciprocating clamps 529 in FIG. 9, the clamps take packs P from between the jaws 92 of a rack R and deliver the packs to the slot 550 where they are picked up by the parallel runs of the belts 556 and 572 for delivery to the rotating head 88.

Referring more particularly to FIGS. 12 to 14, the rotating head 88 includes a platform 586 which is mounted upon legs 587 having out-turned lower ends that are slotted so that the platform 586 may be adjusted normal to the line of the pack conveyor H.

Referring now particularly to FIG. 13, in the center of platform 586 is a bearing well 588 which rotatably receives the lower end of a hollow rotary hub 589 on which are mounted eight identical radially extending arm assemblies, each indicated generally at 590. The drive for the hub 589 is from a bevel gear box 591 which is mounted beneath platform 586 and has an input shaft 592 mounting a sprocket 593 on which a roller chain 594 is trained to drive the bevel gear box 591 from sprocket 460 on the jack shaft 465. Bevel gear box 591 has an output shaft 595 which projects upwardly through platform 586, and a sprocket 596 on said output shaft carries a drive chain 597 which also wraps a drive sprocket 598 on the hub 589. An adjustable tensioning sprocket 599 maintains tension in the chain 597.

As best seen in FIG. 13, each of the arm members 590 includes a channel-like base member 600 having a mounting web 601 bolted to the hub 589, and the channel has a base 602 beneath which a lower jaw member 603 is slidably mounted in hanger brackets. Lower jaw member 603 has a depending spring stud 604 from which a tension spring 605 is connected to a fixed spring stud 606 which extends downwardly from the base 602 of the channel member, so that the slidable lower jaw member 603 is constantly urged outwardly with respect to the hub 589. At the outer end of sliding jaw member 603 is a depending jaw plate 607 the lower margin of which carries a pack gripping bead 608.

A cross pin 609a mounted between the upright sides of the channel member 600 mounts a bell crank, indicated generally at 609, one arm 610 of which extends outwardly above the base 602 of the channel. At the outer end of arm 610 is a depending jaw member 611 at the lower end of which is a round bar 612 which, under certain circumstances, is directly opposite the bead 608 on the jaw plate 607 (see left-hand jaw in FIG. 13 and FIG. 14) so as to grip the upper marginal portion of a pack P between the bead 608 and the bar 612. The bell crank 609 also has an upright arm 613 in spaced relationship to the mounting web 601 of the channel member 600, and a back plate 614 in said arm mounts a bracket 615 for a stud 616 on which a cam follower roller 617 is journalled. Back plate 614 is apertured so that a mounting bolt 618 for a cam follower spring 619 may extend through the aperture and screw into the mounting web 601.

As best seen in FIG. 13, within the hollow hub 589 is an upright fixed spindle 620 that carries a cam plate 621 against which all the cam follower rollers 617 are urged by their respective follower springs 619. As seen in FIGS. 12 and 14, as the head 88 rotates its arms 590 pass succesively over the slot 550 between the belts 556 and 572, and as seen in FIG. 14, 90° later each arm is directly above the pack conveyor H.

During approximately 270° of rotation of the rotating head 88, the bell cranks 609 occupy the elevated position seen to the right in FIG. 13; and during this time the cam follower rollers 617 are bearing upon an idle surface 622 of the cam plate 621. A lobe 623 of greater radius than cam surface 622 has a sharply inclined entry shoulder 624 and a sharply inclined exit shoulder 625 which are so positioned that the bell cranks 609 are pivoted to pack gripping positions as each arm is extending to the right, as seen in FIG. 12, and return to free position 90° later above the pack convyor H.

In order to effect clean pick-up and release of a pack P, without danger of rumpling the signatures, it is necessary that the sliding lower jaw plate 603 be retracted immediately before a pack is gripped, and that it be permitted to slide outwardly to grip the pack against the bar 612 on jaw 611 after said jaw has reached its fully lowered, pack engaging position. Similarly, at the pack release point above the conveyor H, the sliding lower jaw plate 603 must be retracted to release the grip on the signature pack P before the arms 610 are elevated. To accomplish this, a pair of fixed bar cams 626 and 627 (FIGS. 13 and 14, respectively) surmount platform 586 on brackets 628 and 629, respectively, and a cam follower roller 630 at the inner end of each sliding lower jaw bar 603 is positioned to bear upon control cam surfaces 631 and 632 of the respective bar cams 626 and 627. It is apparent from examination of FIGURE 12, that a follower roller 630 rotates into contact with cam surface 631 so as to gradually retract the lower jaw plate 603, and that as the follower 630 rolls along the irregularly curved cam surface to the portions which are radially more distant from the center of hub 589, the jaw plate is returned toward its normal position by the spring 605. Since the normal position of the bar 608 is in contact with bar 612 on the jaw 611, the spring 605 causes a pack P to be gripped firmly between the bead 608 and the bar 612. Conversely, as the cam roller 630 rotates into contact with the cam surface 632, the sliding lower jaw plate 603 is gradually retracted to release the pack P over the pack conveyor H, and as the rotation continues the follower roller 630 moves slowly off the cam surface 632 so as to return the sliding jaw plate 603 gently to its normal position.

Referring now to FIG. 14, the pack conveyor H has a fixed, pack supporting rail 633 which is inclined outwardly about 15° from the horizontal, and a pack conveyor chain 634 carries a succession of closely spaced pack supporting plates 635 which are perpendicular to the base rails 633, and thus inclined outwardly about 15° from the vertical. At the margin of the base rail 633 which is toward the rotating head 88 is a continuous angle member 636 forming a retaining ledge for the lower end of a pack of signatures. As the pack is released by the motion of sliding lower jaw plates 603 and bell crank 609, it drops against the supporting plates 635 so as to recline at about a 15° angle to the vertical as it is carried toward the binder J by the conveyor H. Mounted on the plates 635 are laterally extending pack pushing rods 637 which maintain the proper spacing between the packs as they move toward the binder.

*Shifting the apparatus from two-up pack delivery to one-up pack delivery*

In the general description of the entire apparatus it was pointed out that one of the great advantages of the present system is the flexibility which it permits, due to the alternate modes of operation, with "one-up" delivery or "two-up" delivery of packs to the conveyor H.

In going from two-up delivery to one-up delivery, several minor modifications must be made. In the first place, the gear shift is moved so that the slidable shaft 465 is driven at one-half the rate of speed that it has for two-up delivery. This causes one-half rate operation of the full rack escapement mechanism 77, of the full rack lowering arms 79 and the empty rack elevating arms 84, of the rack unloading transfer means 81 and of the unloading means F–1. On the other hand, the belt unit 87 and rotating head 88 are separately driven off the line shaft 453, and accordingly, they continue to operate at the full rate.

This means that packs P are delivered from the unloading station to the belt unit 87 at twice as long intervals, and also that in the absence of some adjustment there will be a differential between the rate of speed of reciprocating clamps 529 and that of the belts in the belt unit. The basic element which makes the adjustment possible is the design of the conjugate cams 539 and 540 which control the reciprocation of the clamps 529. The cams are so designed that, as seen in FIG. 16, a speed curve for the clamps starts at zero where the pack is picked up by the clamps, rises rapidly to a maximum speed, and then goes through two zones X and Y of approximately constant speed, with the speed in the zone X being double the speed in zone Y. Thus, when the drive for the reciprocating clamps is operating at half speed, the actual rate of movement of the clamps is the same in the zone X as the actual rate of movement in the zone Y when the drive is operating at full speed. Accordingly, the belt unit must be adjusted so that, when the drive is operated at half speed the belt unit receives the signatures in the zone X, while in full speed operation of the drive the belt unit receives the signatures in the zone Y. By this means the pack of signatures is always transferred from the clamps 529 to the belt unit 87 at a time when both the clamp and the belts are traveling at the same rate of speed.

It will be recalled that pulleys 555 and 571 of the belt unit were described as removable pulleys; and they are, in the sense that their slotted mounting 555a and 571a permit them to be moved a sufficient distance laterally to free the respective belts 556 and 572 from them so that said belts extend directly from the fixed pulleys 553 and 569 to the adjustable pulleys 554 and 570, respectively. The pulley 554 is mounted directly upon an adjusting lever 638 which is pivoted at 639 and has a pin and slot guide means 640, so that the end of the lever carrying the pulley 554 may be moved farther from the pulley 553. Similarly, the adjustable pulley 570 is carried upon a slide bar 641, and the slide bar 641 in turn has one end pivotally mounted at 642 on an adjusting lever 643 which is pivoted at 644 on the platform 547 and has a pin and slot guide 645.

When the adjustable pulleys 554 and 570 are in the positions illustrated in FIG. 12, the belts 556 and 572 receive a pack from the reciprocating clamps 529 in the zone Y indicated on the speed curve FIG. 16; while the adjustment of the pulleys 554 and 570 just described causes the belts to receive a pack from the reciprocating clamps 529 in the zone X of the speed curve.

Because of the shift in the point at which the belts 556 and 572 receive a pack from the clamps 529, it is also necessary to adjust the point at which the clamps open to release the pack; and this is accomplished by rotating the jaw actuating control cam 543 a few degrees on the cam shaft 494 when the apparatus is shifted from two-up to one-up operation.

In view of the half speed operation of the rack handling and pack unloading means, the space between packs P in the belt unit is twice as great as that indicated in FIG. 12, so a pack is delivered by the belt unit only for every other arm 590 of the rotating head 88. Since the purpose of one-up delivery of packs is to deliver packs to the pack conveyor H alternately from the unit I and the unit II, when an arm 590 of the unit I which is carrying no pack swings into position over the pack conveyor H, its jaw 611 would interfere with the pack already deposited on the conveyor by the unit II if it were in pack gripping position. To avoid such interference, alternate arms 590 of the rotating head 88 are disabled by removing the cam follower rollers 617. This, of course, causes the bell cranks 609 from which the follower rollers 617 have been removed to remain in an elevated position where they do not interfere with the packs on the pack conveyor H.

The remaining adjustments necessary for one-up delivery of the packs to the pack conveyor H include bodily movement of the rotating head 88 toward the pack conveyor so that the arms 590 of the unit I will deposit the packs P with their lower ends against the bottoms of the supporting plates 635; and the angle member 636 is shifted toward the plates 635 so as to closely confine the packs. In the case of two-up delivery, the position of the rotating head 288 is such that the arms 590 of the unit I deliver packs P with their lower ends against the lower ends of the packs already delivered to the pack conveyor H by the unit II. In the case of three-up operation, packs from the unit III rest against the plates 635, packs from the unit II rest against the packs from the unit III, and packs from the unit I rest against packs from the unit II. In each case the angle member 636 is shifted to the position required by the total thickness of the packs being delivered by the conveyor H to the binder J.

The foregoing detailed description is given for clearness of understanding only, and no unnecessary limitations are to be understood therefrom, for some modifications will be obvious to those skilled in the art.

I claim:

1. Apparatus for handling packs of printed signatures, comprising: a plurality of storage and transfer racks; a plurality of sets of pack gripping jaws arranged side-by-side in each rack, each of said sets of jaws gripping one pack of signatures; an unloading station; transfer means for moving racks filled with packs of signatures successively through the unloading station; unloading means in the unloading station for removing packs seriatim from the jaws in the successive racks; a moving pack conveyor to deliver pack end-to-end to a binding machine; and a conveyor feed means which receives packs seriatim from the unloading means and deposits them on the pack conveyor.

2. The apparatus of claim 1 which includes storage and forwarding means to forward full racks toward the unloading station, storage and return means to move empty racks away from the unloading station, rack delivery apparatus for moving full racks from said storage and forwarding means into the unloading station, and rack removal apparatus for moving empty racks from the unloading station to the storage and return means.

3. The apparatus of claim 1 in which the pack gripping jaws are normally closed, means is provided for momentarily opening each set of jaws at a predetermined position in the unloading station, the unloading means includes a reciprocating member and clamps on said member which grip a pack before it is released by the rack jaws, and the conveyor feed means includes parallel belts between which the reciprocating member releases the packs seriatim.

4. The apparatus of claim 3 in which the feed means also includes a rotating member with a plurality of radial arms, and jaws on said arms which grip a pack as it leaves the parallel belts and deposit said pack on the pack conveyor.

5. The apparatus of claim 4 in which the transfer means includes mechanism to move the racks intermittently and stop each set of jaws containing a pack of signatures momentarily in alignment with the unloading clamps, and in which the jaw opening means opens each set of jaws when said set is stopped in alignment with the unloading clamps.

6. Apparatus for handling packs of printed signatures, comprising: a plurality of storage and transfer racks, each rack being adapted to retain several packs of signatures in spaced relationship; an unloading station; transfer means for moving racks filled with packs of signatures successively through the unloading station; reciprocating clamp means for removing packs seriatim from the successive racks; cam means for reciprocating said clamp means at a controlled variable speed such that it moves away from the rack at a predetermined speed throughout a first part of its travel and at one-half the determined speed throughout a second part of its travel; first drive means for driving said transfer means and rotating said cam means; feeding means which receives packs successively from said clamp means; second drive means for driving said feeding means at a speed equal to one-half of said determined speed; and means for adjusting said feeding means to receive packs from the clamp selectively in said first part or said second part of the clamp travel.

7. The apparatus of claim 6 which includes means for operating said first drive means selectively at a normal speed or at one-half said normal speed, and in which the feeding means is selectively adjusted to receive packs in the second part of the clamp travel when the first drive means is operating at normal speed, or in the first part of the clamp travel when said first drive means is operating at one-half said normal speed.

8. Apparatus for handling packs of signatures, comprising: a pack conveyor for feeding packs of signatures seriatim to a binder; means driving said pack conveyor at a fixed speed, a plurality of racks, each rack being adapted to retain a plurality of packs of signatures in spaced relationship; an unloading station; transfer means for moving racks successively through the unloading station; reciprocating clamp means for unloading packs seriatim from said racks as they move through the unloading station; cam means for reciprocating said clamp means at a controlled variable speed such that it moves away from the rack at a determined speed throughout a first part of its travel and at one-half said determined speed throughout a second part of its travel, said determined speed being double the fixed speed of the pack conveyor; two speed drive means for operating said transfer means and said cam means, said two speed drive means being selectively operable at a normal speed or at a second speed which is one-half said normal speed; feeding means to receive packs from said clamps and deposit them on said conveyor; means for driving said feeding means at a fixed speed equal to that of the conveyor; and means for adjusting said feeding means to receive packs from the clamps selectively in said first part of the clamp travel or in said second part of the clamp travel.

9. The apparatus of claim 8 in which the feeding means includes parallel belts which receive packs from the clamps, and said belts are adjustable to position an end selectively in said first or said second part of the clamp travel.

10. The apparatus of claim 9 in which the feeding means also includes a rotating head with a plurality of radical arms having jaw means to grip a pack; means for causing said jaw means to grip a pack as it leaves said parallel belts, and means for causing said jaw means to release a pack onto said conveyor.

11. Apparatus for handling packs of printed signatures, comprising: a plurality of storage and transfer racks, each rack being adapted to retain several packs of signatures in spaced relationship; an unloading station; transfer means for moving racks filled with packs of signatures successively through the unloading station; unloading means in the unloading station for removing packs seriatim from the successive racks; a moving pack conveyor to deliver packs end-to-end to a binding machine; and conveyor feed means which receives packs seriatim from the unloading means and deposits them on the pack conveyor, said conveyor feed means including a rotating member having a plurality of radial arms, said arms have clamps to grip packs of signatures, and means for intermittently opening and closing said clamps to grip packs in the unloading means and release them in the pack conveyor.

12. Apparatus for handling packs of printed signatures, comprising: a plurality of storage and transfer racks, each rack being adapted to retain several packs of signatures in spaced relationship; an unloading station; transfer means for moving racks filled with packs of signatures successively through the unloading station; unloading means in the unloading station for removing packs seriatim from the successive racks; a moving pack conveyor to deliver packs end-to-end to a binding machine, said pack conveyor including a base belt for supporting packs of signatures on edge, and an elevated belt above one edge of the base belt, said elevated belt having a surface against which said packs rest in an inclined position; and conveyor feed means which receives packs seriatim from the unloading means and deposits them on the pack conveyor, said conveyor feed means including a rotating member which is bodily movable with respect to the pack conveyor to deposit packs selectively either against said surface or in face abutment with a pack of signatures already positioned against said surface.

13. Apparatus for handling packs of printed signatures, comprising: a plurality of storage and transfer racks, each rack being adapted to retain several packs of signatures in spaced relationship; an unloading station; overhead storage and forwarding means to forward full racks toward the unloading station; rack delivery apparatus for moving full racks from said storage and forwarding means into the unloading station, said rack delivery apparatus including rotary arms to move the racks, said arms being on horizontal axes; unloading means in the unloading station for removing packs seriatim from the successive racks; storage and return means to move empty racks away from the unloading station; rack removal apparatus for moving empty racks from the unloading station to the storage and return means, said rack removal apparatus including rotary arms to move the racks, said arms being on horizontal axes; a moving pack conveyor to deliver packs end-to-end to a binding machine; and conveyor feed means which receives packs seriatim from the unloading means and deposits them on the pack conveyor.

14. The apparatus of claim 13 which includes drive means that rotate the arms and operates both the unloading means and the conveyor feeder in timed relationship with the movement of the pack conveyor.

References Cited

UNITED STATES PATENTS 2,423,557    7/1947    Gray _____ 214—16.4 X
2,830,715    4/1958    Oholm _____ 214—18

ROBERT G. SHERIDAN, *Primary Examiner.*

F. E. WERNER, *Assistant Examiner.*